United States Patent Office 3,775,416
Patented Nov. 27, 1973

3,775,416
s-TRIAZOLO[3,4-a]ISOQUINOLINES AND
DERIVATIVES THEREOF
Hans K. Reimlinger, Brussels, and Jan Joseph Maurice Vandewalle, Mortsel, Belgium, assignors to Mallinckrodt Chemical Works, St. Louis, Mo.
No Drawing. Continuation of application Ser. No. 849,208, Aug. 11, 1969, which is a continuation-in-part of appplication Ser. No. 634,077, Apr. 27, 1967, both now abandoned. This application July 21, 1971, Ser. No. 164,919
Int. Cl. C07d 55/06
U.S. Cl. 260—288 R                          1 Claim

ABSTRACT OF THE DISCLOSURE

Novel s-triazolo[3,4-a]isoquinolines are prepared by (a) contacting 1-haloisoquinolines with hydrazine, (b) contacting the resulting 1-hydrazinoisoquinoline with an acidic condensing agent and (c) separating the s-triazolo[3,4-a]isoquinoline. Thereafter, the s-triazolo[3,4-a]isoquinoline can be reduced to provide 5,6-dihydro-s-triazolo[3,4-a]isoquinolines. The s-triazolo[3,4-a]isoquinolines of this invention are useful as ultraviolet light absorbers and corrosion inhibitors.

---

This application is a continuation of application Ser. No. 849,208, filed Aug. 11, 1969, which is a continuation-in-part of U.S. patent application Ser. No. 634,077 entitled "s - Triazolo[3,4 - a]isoquinolines and Derivatives Thereof" filed Apr. 27, 1967, by H. K. Reimlinger and J. J. M. Vandewalle, now abandoned.

This invention relates to the preparation of heterocyclic nitrogen containing compounds. In one aspect, this invention relates to a novel process for the preparation of 1-hydrazinoisoquinolines and novel derivatives thereof. In a further aspect, this invention relates to the preparation of novel s-triazolo[3,4-a]isoquinolines and 5,6-dihydro-s-triazolo[3,4-a]isoquinolines.

Although a variety of isoquinolines have been reported in the literature, the processes for the preparation of 1-hydrazinoisoquinoline have not always given completely satisfactory results. For example, Hoste and Gillis, Meded. Kon. VI Acad. 13, No. 12, 3 (1951), reported a process for the preparation of 1-hydrazinoisoquinoline. However, when this procedure was duplicated it did not give entirely satisfactory results because of a sudden exothermic reaction which occurred when the reactants were slowly heated. As a result, the formation of side products was encountered and the expected yield of the desired 1-hydrazinoisoquinoline substantially decreased. Additionally, U.S. Pat. 2,719,158, discloses a method for the preparation of 1-hydrazinoisoquinoline wherein the reaction is effected in ethanol and in a closed vessel. However, this procedure is only applicable as mentioned in the patent for isoquinolines, which are otherwise unsubstituted.

Although a large number of isoquinolines are known, to date there have been relatively few disclosures of s-triazolo[3,4-a]isoquinolines. S. Naqui and V. R. Srinivasan in the Indian Journal of Chemistry, vol. 3, 162 (1965), report the preparation of 2-phenyl-s-triazolo[3,4-a]isoquinoline by the oxidative cyclization of 1-isoquinolylhydrazones. Further reference to s-triazolo[3,4-a]isoquinolines has recently been reported by G. S. Sidhu, S. Naqui and D. S. Lyengar in Journal of Heterocyclic Chemistry, vol. 3, 158–164 (1966). However, for the most part, the compositions disclosed are limited to those having substituents in the 3-position, predominently aromatic groups.

Accordingly, one or more of the following objects will be achieved by the practice of this invention. It is an object of this invention to provide novel s-triazolo[3,4-a]isoquinolines and derivatives thereof. A further object of this invention is to provide a process for the preparation of the aforementioned novel compositions. Another object is to provide a novel process for the preparation of derivatives of s-triazolo[3,4-a]isoquinolines. A further object is to provide certain novel intermediates useful in the preparation of the s-triazolo[3,4-a]isoquinolines. A still further object of the invention is to provide s-triazolo[3,4-a]isoquinolines and derivatives thereof which are useful in a wide variety of applications. These and other objects will readily become apparent to those skilled in the art in the light of the teachings herein set forth.

In one aspect, the invention is directed to the preparation of s-triazolo[3,4-a]isoquinolines of the formula:

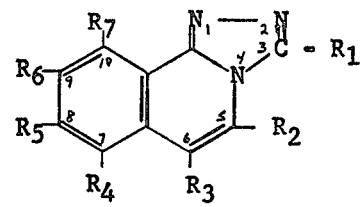

wherein $R_1$–$R_7$ represent hydrogen, aliphatic, cycloaliphatic, aromatic or heterocyclic groups containing up to 24 carbon atoms and more preferably up to 12 carbon atoms. Preferred compositions which can be prepared by the process of this invention are those wherein at least one, and preferably two or more of said R groups are other than hydrogen. Also preferred are those compositions wherein $R_1$ is an aliphatic group free from aromatic and heterocyclic ring structures and is attached to the ring carbon atom through a nitrogen atom, or when $R_1$ contains at least one other element consisting of oxygen or nitrogen, then it can be attached to the ring carbon atom through a carbon atom.

Other preferred compositions are those wherein $R_1$–$R_7$ represents hydrogen or a group composed of at least one element selected from the group consisting of carbon, oxygen, nitrogen and sulfur, any remaining valences being satisfied by hydrogen. Particularly preferred compositions are those wherein $R_1$ represents hydrogen, alkyl, alkoxy, alkoxyaryl, alkoxyaralkyl, alkylthio, alkylsulfonyl, alkenyl, cycloalkyl, cycloalkenyl, aryl, alkaryl, aralkyl, halo, e.g., chloro, bromo, haloalkyl, haloaryl, haloaralkyl, amino, aminoalkyl, alkylaminoalkyl, dialkylamino, dialkylaminoalkyl, dialkylaminoalkylamino, carboxy, carboxyalkyl, carboalkoxy, carboalkoxyalkyl, amido, alkylamido, amidoalkyl, alkylamidoalkyl, arylamido, arylamidoalkyl, aralkylamido, arylamidoalkyl, aralkylamido, aralkylamidoalkyl, carbamido, alkylcarbamido, carbamidoalkyl, alkylcarbamidoalkyl, pyridyl, piperidyl, morpholinyl, thio, alkylthio, cyano, cyanoalkyl, nitro, nitroalkyl, hydroxyl, hydroxyalkyl, hydroxyaryl, hydroxyaralkyl, and the like.

One embodiment of this aspect of the invention relates to s-triazolo[3,4-a]isoquinolines containing only one substituent in the 3-position. These compositions can be represented by the formula:

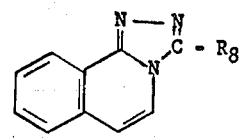

wherein $R_8$ represents an open chain aliphatic group which is attached to the ring carbon atoms through a carbon or nitrogen bond, and contains at least one element selected from the group consisting of halogen, oxygen or nitrogen, and at least one other element selected from the group consisting of carbon or hydrogen. Preferred compositions are those wherein $R_8$ contains up to 36 atoms, preferably 24 and represents amino, aminoalkyl, alkylaminoalkyl, dialkylaminoalkyl, haloalkyl, hydroxyalkyl, carboxyalkyl, carboalkoxy, carboalkoxyalkyl, alkylamidoalkyl, alkylcarbamido, alkylcarbamidoalkyl, and the like.

Illustrative compositions within this embodiment of the invention include, among others, 3-amino-s-triazolo[3,4-a]isoquinoline,
3-aminomethyl-s-triazolo[3,4-a]isoquinoline,
3-aminoethyl-s-triazolo[3,4-a]isoquinoline
3-(N,N-dimethylaminoethyl)-s-triazolo[3,4-a]isoquinoline,
3-(N-methylaminomethyl)-s-triazolo[3,4-a]isoquinoline,
3-(N,N-diethylaminopropyl)-s-triazolo[3,4-a]isoquinoline,
3-(N,N-dimethylaminomethyl)-s-triazolo[3,4-a]isoquinoline,
3-(N,N-dimethylaminopropyl)-s-triazolo[3,4-a]isoquinoline,
3-trifluoromethyl-s-triazolo[3,4-a]isoquinoline,
3-chloroethyl-s-triazolo[3,4-a]isoquinoline,
3-hydroxyalkyl-s-triazolo[3,4-a]isoquinoline,
3-carboethoxy-s-triazolo[3,4-a]isoquinoline,
3-carboethoxymethyl-s-triazolo[3,4-a]isoquinoline,
3-(N-methylcarbamido)-s-triazolo[3,4-a]isoquinoline,
3-(N-methylamidomethyl)-s-triazolo[3,4-a]isoquinoline,
3-(N-ethylamidomethyl)-s-triazolo[3,4-a]isoquinoline,
3-(N,N-dimethylamidomethyl)-s-[3,4-a]isoquinoline,
and the like.

A second embodiment of the invention relates to s-triazolo[3,4-a]isoquinolines containing a substituent in the 5-position of the molecule. The s-triazolo[3,4-a]isoquinoline may or may not also contain a second substituent in the 3-position. These compositions can conveniently be represented by the following formula:

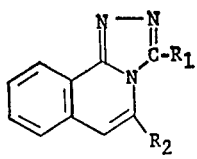

wherein $R_1$ and $R_2$ have the same values as previously indicated. Preferred compositions within this embodiment include those wherein $R_1$ represents hydrogen, alkyl, hydroxyl, carboalkoxy, carboalkoxyalkyl, arylamido, arylamidoalkyl, and the like, and $R_2$ represents halo, alkyl, alkoxy, aralkylamino, N-piperidyl and the like.

Illustrative compositions within this embodiment include, 3-hydroxy-5-methyl-s-triazolo[3,4-a]isoquinolines,
3,5-dimethyl-s-triazolo[3,4-a]isoquinolines,
5-methyl-s-triazolo[3,4-a]isoquinolines,
3,carboethoxy-5-chloro-s-triazolo[3,4-a]isoquinolines,
5-chloro-s-triazolo[3,4-a]isoquinolines,
3-benzylamidomethyl-5-chloro-s-triazolo[3,4-a]isoquinolines,
3-carboethoxymethyl-5-chloro-s-triazolo[3,4-a]isoquinolines,
5-methoxy-s-triazolo[3,4-a]isoquinolines,
3-benzylamido-5-benzylamino-s-triazolo[3,4-a]isoquinolines,
5-(N-piperidyl)-s-triazolo[3,4-a]isoquinolines,
and the like.

A third embodiment of this aspect of the invention is directed to s-triazolo[3,4-a]isoquinolines containing substituents in the 6-position of the molecule. The s-triazolo[3,4-a]isoquinoline may or may not also contain a second substituent in the 3-position. These compositions can be represented by the formula:

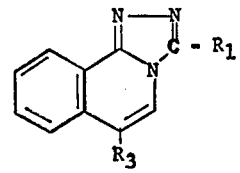

wherein $R_1$ and $R_3$ have the same values as previously defined. Preferred compositions within this embodiment include those wherein $R_1$ represents hydrogen, alkyl, haloalkyl, alkylthio, hydroxyl, thio, arylamidoalkyl, aminoalkyl, and the like, and $R_3$ represents halogen or cyano.

Typical compositions within this embodiment include, among others, 3-methyl-6-chloro-s-triazolo[3,4-a]isoquinoline,
3-trifluoromethyl-6-chloro-s-triazolo[3,4-a]isoquinoline,
3-methylthio-6-chloro-s-triazolo[3,4-a]isoquinoline,
6-chloro-3-carboethoxymethyl-s-triazolo[3,4-a]isoquinoline,
3-thio-6-chloro-s-triazolo[3,4-a]isoquinoline,
3-ethylthio-6-chloro-s-triazolo[3,4-a]isoquinoline,
3-benzoylaminomethyl-6-chloro-s-triazolo[3,4-a]isoquinoline,
3-(α-aminoethyl)-6-chloro-s-triazolo[3,4-a]isoquinoline,
3-(α-aminopropyl)-6-chloro-s-triazolo[3,4-a]isoquinoline,
3-benzylcarbamidoethyl-6-chloro-s-triazolo[3,4-a]isoquinoline,
3-(1-benzylcarbamido-2-methylethyl)-6-chloro-s-triazolo[3,4-a]isoquinoline,
6-chloro-s-triazolo[3,4-a]isoquinoline,
6-bromo-s-triazolo[3,4-a]isoquinoline,
6-methyl-s-triazolo[3,4-a]isoquinoline,
6-cyano-s-triazolo[3,4-a]isoquinoline,
3-trifluoromethyl-6-cyano-s-triazolo[3,4-a]isoquinoline,
6-nitro-s-triazolo[3,4-a]isoquinoline,
6-amido-s-triazolo[3,4-a]isoquinoline,
3-carbomethoxy-6-chloro-s-triazolo[3,4-a]isoquinoline,
and the like.

A final embodiment of this aspect of the invention relates to s-triazolo[3,4-a]isoquinolines containing substituents on the benzene moiety of the molecule. These compositions may or may not contain substituents in the 3, 5 or 6 positions and can be represented by the following formula:

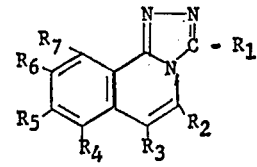

wherein $R_1$–$R_7$ are as previously defined. Preferred compositions are those wherein $R_5$ and $R_6$ represent alkoxy groups.

Illustrative compositions within this embodiment include such s-triazolo[3,4-a]isoquinolines as the following:

8,9-dimethoxy-s-triazolo[3,4-a]isoquinoline,
3-trifluoromethyl-8,9-dimethoxy-s-triazolo[3,4-a]isoquinoline,
6-chloro-8,9-dimethoxy-s-triazolo[3,4-a]isoquinoline,
3-trifluoromethyl-6-chloro-8,9-dimethoxy-s-triazolo[3,4-a]isoquinoline,
7-nitro-s-triazolo[3,4-a]isoquinoline,
7-amino-s-triazolo[3,4-a]isoquinoline hydrochloride,
7-chloro-8,9-s-triazolo[3,4-a]isoquinoline,
7-nitro-6-hydroxy-s-triazolo[3,4-a]isoquinoline,
and the like.

In practice, it has been found that the s-triazolo[3,4-a]isoquinolines of the aforementioned embodiments of this invention can be conveniently prepared by the reaction of a hydrazinoisoquinoline with an acidic reagent in accordance with the following reaction:

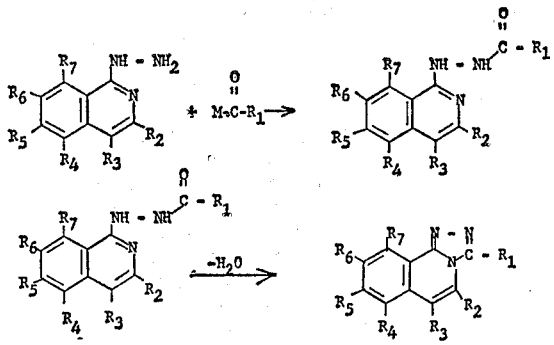

wherein $R_1$–$R_7$ are as previously defined and M has a value as hereinafter indicated.

Although the reaction can be effected in the presence or absence of a solvent, it has been observed that the optimum results are obtained when a solvent is not employed. However, if it is desired to separate the intermediate N-substituted hydrazinoisoquinoline product, as hereinafter indicated, then a solvent should be used. Suitable solvents which can be employed are the normally liquid, inert organic solvents, such as, the halogenated hydrocarbons, alcohols, heterocyclic compositions, and the like. Illustrative solvents include, among others, n-butanol, pyridine, dichloromethane, chloroform, carbon tetrachloride and the like.

The particular temperature employed will be influenced by the melting or boiling points of the acidic reagent, particularly if they are employed as the solvent. In general, however, the reaction can be conducted within a temperature range of from about 60° to about 200° C. Pressure is not necessarily critical and the process can be effected under atmospheric, subatmospheric or superatmospheric conditions.

Suitable acidic reagents which can be employed in the practice of the process of this invention are those represented by the aforesaid formula wherein M represents halo, hydroxyl,

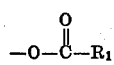

or —$OR_1$, wherein $R_1$ is as previously indicated. Illustrative acidic reagents include, for example, acid halides, such as benzoyl chloride, acid anhydrides, such as acetic anhydride, propionic anhydride, and the like, esters, such as, diethylmalonate, triethyl orthoformic ester, and the like, acids, such as trifluoroacetic acid, stearic acid, hippuric acid, and the like. In place of the aforementioned acidic reagents carbon disulfide can be employed leading to the formation of 3-thiono-2,3-dihydro-s-triazolo[3,4-a]isoquinolines. Similarly, when isocyanates or urethanes are employed the corresponding 3-oxo-2,3-dihydro-s-triazolo[3,4-a]isoquinolines are obtained.

The hydrazinoisoquinolines employed as starting materials in the aforementioned process, are prepared from the corresponding 1-haloisoquinolines and hydrazine in accordance with known techniques.

In many instances s-triazolo[3,4-a]isoquinolines having the desired ring or nitrogen substituents can be prepared directly from the corresponding ring-substituted hydrazinoisoquinoline and particular acidic reagent. However, in some cases due to availability of the starting material or reactivity of substituents it may be desirable to introduce such substituents after ring closure either on the ring carbon or nitrogen atoms. For example, while the reaction of hydrazinoisoquinoline and diethylmalonate gave the 3-carboethoxymethyl-s-triazolo[3,4-a]isoquinoline directly, the 3-methylacetamide-s-triazolo[3,4-a]isoquinoline is prepared as a derivative of the former by the reaction with methylamine. This was effected by allowing methylamine and 3-(s-triazolo[3,4-a]isoquinolyl)ethyl acetate to stand at room temperature for about 15 hours. When ethylamine or dimethylamine were employed, the corresponding amide was obtained.

Moreover, 3-(β-hydroxyethyl) - s - triazolo[3,4-a]isoquinoline was conveniently prepared by reduction of the 3-carboethoxymethyl derivative with lithium aluminum hydride in ether. Preparation of the 3-aminomethyl-s-triazolo[3,4-a]isoquinoline was accomplished by hydrolysis with hydrochloric acid of 3-benzamidomethyl-s-triazolo-[3,4-a]isoquinoline which in turn had been prepared from 1-hydrazinoisoquinoline and benzoyl alanine. The 2-methyl-3-oxy-2,3-dihydro - s - triazolo[3,4-a]isoquinoline was prepared by the reaction in ether of diazomethane and 3-oxo-2,3 - dihydro - s - triazolo[3,4-a]isoquinoline. In a similar manner, the reaction of 3-thiono-2,3-dihydro-s-triazolo[3,4-a]isoquinoline with diazomethane gave 2-methyl-3-thiono - 2,3 - dihydro-s-triazolo[3,4-a]isoquinoline and in addition, 3-methylthio-s-triazolo[3,4-a]isoquinoline. Other derivatives are conveniently prepared employing the reactants and conditions set forth in the examples.

In a further aspect, the present invention is concerned with certain novel N-substituted N'-(1-isoquinoyl)hydrazines which are formed as intermediates in the preparation of the s-triazolo[3,4-a]isoquinolines. These compositions can be conveniently represented by the following formula:

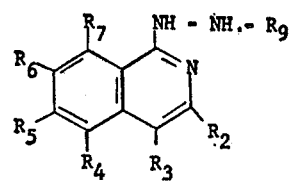

wherein $R_2$–$R_7$ have the same value as previously described and $R_9$ represents carboalkoxy, halocarboalkoxy, halocarboalkoxy, hydrocarbyl, carbonyl, alkylcarbonyl, arylcarbonyl, aralkylcarbonyl, haloarylcarbonyl, arylalkynylcarbonyl, carboxyalkenylcarbonyl, amido, alkylamido, dialkylamido, thioamido, and the like.

Illustrative compositions include, among other,

N-amido N'-(1-isoquinolyl)hydrazine,
N-carboethoxy N'-(1-isoquinolyl)hydrazine,
N-benzoyl N'-(1-isoquinoyl)hydrazine,
N-(o,p-dichlorophenoxy) N'-(1-isoquinoyl)hydrazine,
N-phenylethynyl N'-(1-isoquinoyl)hydrazine,
4-chloro-1-isoquinolylhydrazine,
N-carboethoxy-N'-(4-chloro-1-isoquinolyl)hydrazine,
N-methoxymethyl-N'-(3-chloro-1-isoquinoyl)hydrazine,
N-trichloromethylcarbonyl N'-(1-isoquinoyl)hydrazine,
N-thioamido N'-(1-isoquinolyl)hydrazine,
and the like.

The aforementioned N-substituted N'-(1-isoquinoyl) hydrazine intermediates are conveniently prepared by the reaction in a solvent of the acidic reagent as hereinbefore described with the hydrazine group of the isoquinoyl hydrazine. Depending upon the choice of acidic reagent and the presence or absence of ring substituents, a wide variety of intermediate products can be prepared. The reaction can be illustrated as follows:

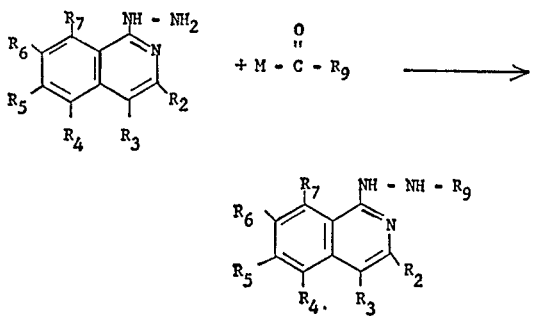

wherein $R_1$–$R_7$ and $R_9$ are as previously described, M represents halo, hydroxyl, or

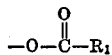

The N-substituted N'-(1-isoquinoyl)hydrazines are conveniently prepared by conducting the reaction of the isoquinoyl hydrazine and acidic reagent in the presence of an inert organic solvent. If the reaction is not effected in a solvent, it will go to completion, i.e., to the formation of the s-triazolo[3,4-a]isoquinoline. Suitable solvents which can be employed include, among others, the alcohols, such as n-butanol, ethers, such as diethyl ether, benzene, xylene, dioxane, and the like. The only requirement is that the solvent does not react with the starting materials or product.

Temperature is not necessarily critical and it has been observed that the reaction can be effected at temperatures of from about 60° to about 200° C. and higher, and more preferably from about 60° to 140° C.

Pressure has no influence on the reaction and hence it can be conducted at atmospheric, subatmospheric or superatmospheric pressures.

A further embodiment of this invention is directed to 5,6-dihydro-s-triazolo[3,4-a]isoquinolines. These compounds can be represented by the following formula:

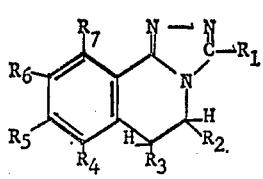

wherein $R_1$–$R_7$ have the same value as previously described. These compositions are prepared, as indicated in the examples, by the hydrogenation of the corresponding s-triazolo[3,4-a]isoquinolines. The resulting compositions are the same as the s-triazolo[3,4-a]isoquinolines set forth above with the exception that a single bond is present between carbon atoms in positions 5 and 6.

In practice, hydrogenation is effected in an inert organic solvent in the presence of a hydrogenation catalyst. Suitable solvents include benzene, toluene, ethanol, xylene, carbon tetrachloride, and the like. A wide variety of hydrogenating catalyst can be employed such as, for example, Raney nickel, platinum, and the like.

The temperature can range from about room temperature, and lower, to about 60° C. and higher.

In general, it has been observed that the s-triazolo [3,4-a]isquinolines of this invention, as well as the 5,6-dihydro-s-triazolo[3,4-a]isoquinolines are useful in a variety of fields. For example, the compositions of this invention are useful as ultraviolet light absorbers and hence find wide application in a variety of products wherein stability from ultraviolet light is desired. For instance, products such as many plastic articles which normally are susceptible to degradation by ultraviolet light can be stabilized by the compositions of this invention.

It has also been observed that the compositions of this invention are useful as corrosion inhibitors, particularly for aqueous glycol-based fluids. It is well known that polyoxyalkylene glycol fluids are useful as lubricants for wire drawing and other metal-forming operations. These fluids are often diluted with from five to ten or more parts water. Corrosion inhibitor additives are therefore desirable particularly when the fluids come in contact with metals. In practice, the compositions of this invention are particularly useful as corrosion inhibitors in glycol-based fluids which come in contact with iron, steel, copper, brass, and the like.

The relative amount of s-triazolo[3,4-a]isoquinoline which is required for satisfactory corrosion protection will vary with the particular fluid, as well as with the use to which the fluid may be put. In practice, however, a concentration range of from about 0.01 to about 5.0 weight percent and more preferably from about 0.1 to about 1.0 weight percent of the compositions of this invention in the glycol have been found to be satisfactory.

It has also been observed that the s-triazolo[3,4-a]isoquinolines and the 5,6-dihydrotriazolo[3,4-a]isoquinolines which have a sulfur-containing substituent are particularly effective as corrosion inhibitors.

The following examples are illustrative:

EXAMPLE 1

Preparation of N-benzoyl N'-(1-isoquinoyl)hydrazine 11.2 grams of 1-hydrazinoisoquinoline were dissolved in 500 milliliters of warm ethanol and 15.9 grams of benzoic acid anhydride added in portions. After cooling to room temperature there was obtained 5.4 grams of N-benzoyl N'-(1-isoquinoyl)hydrozine having a melting point of 219° C. (decomp.) and an elemental analysis as follows:

Calculated (percent): C, 73.00; H, 4.95; N, 16.00; O, 6.08. Found (percent): C, 72.97; H, 4.98; N, 16.45; O, 6.30.

EXAMPLE 2

Preparation of 1-(N-carbethoxyhydrazino)-isoquinoline 9.6 grams of 1-hydrazinoisoquinoline were dissolved in 65 milliliters of ethyl chloroformate and refluxed for 8 hours. The product crystallized after cooling and was filtered off. There after it was dissolved in ethanol and precipitated with ether. There was obtained 12.0 grams of 1-(N-carboethoxy hydrazino)isoquinoline which represented a 75 percent yield. The product had a melting point of 270° C. (decomp.) and the following elemental analysis:

Calculated (percent): C, 53.84; H, 5.27; N, 15.69; O, 11.95. Found (percent): C, 54.10; H, 5.42; N, 15.53; O, 12.32.

EXAMPLES 3–13

In a similar manner, the isoquinolylhydrazines set forth in Table I were prepared using the indicated acidic reagents and solvents. The yields, melting or boiling points and elemental analysis are set forth for each composition:

TABLE 1.—PREPARATION OF HYDRAZINOISOQUINOLINE INTERMEDIATES

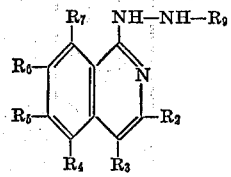

| Ex. | R₉ (or structure) | Reactants | Solvent | Yield in percent | Melting or boiling point, °C. | Calculated | | | | Found | | | |
|---|---|---|---|---|---|---|---|---|---|---|---|---|---|
| | | | | | | C | H | N | O | C | H | N | O |
| 3 | —CONH₂ | 1-hydrazinoisoquinoline and potassiumcyanate. | Normal hydrochloric acid. | 78 | ¹185-Y | 58.86 | 5.24 | 26.53 | 11.36 | 56.95 | 5.25 | 26.92 | 11.28 |
| 4 | —CO—⟨C₆H₃Cl₂⟩ (2,4-dichloro) | 1-hydrazinoisoquinoline and 2,4-dichlorobenzoylchloride. | Dichloromethane. | 80 | 206 | 57.86 | 3.31 | 12.65 | | 58.10 | 3.44 | 12.49 | |
| 5 | —COC≡C—C₆H₅ | Phenylpropiolic acid chloride and 1-hydrazinoisoquinoline. | ...do... | 63 | ¹180-1 | 75.24 | 4.56 | 14.62 | | 74.22 | 4.48 | 14.43 | |
| 6 | R₉=—H, R₃=—Cl | 1,4-dichloroisoquinoline and hydrazine hydrate. | N-butanol | 51 | 188-190 | 55.84 | 4.17 | 21.70 | | 56.29 | 4.15 | 22.07 | |
| 7 | R₉=—CO₂C₂H₅, R₃=—Cl | Chloroformic acid ethyl ester and 4-chloro-1-hydrazinoisoquinoline. | Chloroformic acid ethyl ester. | 88 | 230 | 47.69 | 4.35 | 13.91 | 10.55 | 47.63 | 4.39 | 13.86 | 10.72 |
| 8 | R₉=—COCH₃, R₂=—Cl | 3-chloro-1-hydrazinoisoquinoline and acetylchloride. | Dichloromethane. | 44 | ²91-4 | 56.05 | 4.28 | 17.83 | | 56.00 | 4.36 | 17.74 | |
| 9 | R₉=—COCF₃, R₂=—Cl | 3-chloro-1-hydrazinoisoquinoline and trifluoroacetic acid. | Trifluoroacetic acid. | 82 | 147-150 | 45.62 | 2.43 | 14.51 | | 46.19 | 2.53 | 14.61 | |
| 10 | R₉=H | 1-chloro-3-methylisoquinoline and hydrazine hydrate. | N-butanol | 95 | 151-152 | 69.34 | 6.40 | 24.26 | | 69.12 | 6.40 | 24.68 | |
| 11 | —C(O)—CCl₃ | Trichloroacetic acid | | 21 | ²140+ | 43.73 | 2.64 | 13.79 | | 43.36 | 2.57 | 12.39 | |
| 12 | —C(O)—CH=CH—CO₂H | 1-hydrazinoisoquinoline and maleic anhydride. | Benzene | 90 | ²190-200+ | 60.69 | 4.31 | 16.34 | | 61.59 | 4.19 | 16.13 | |
| 13 | —C(S)—NH₂ | 1-hydrazinoisoquinoline and ammoniumchloroamid. | Diluted HCl | 87 | 200-201 | 55.04 | 4.62 | 25.68 | | 55.06 | 4.55 | 25.65 | |

¹ Crystals with ½ mol H₂O.
² Decomposed.

EXAMPLE 14

Preparation of s-triazolo(3,4-a)isoquinolines (a) By reaction of a hydrazinoisoquinoline with an acid chloride.—21.5 grams of 1-hydrazinoisoquinoline, 14.7 milliliters of benzoyl chloride and 200 milliliters of pyridine are refluxed for 2 hours. After cooling to room temperature 6.0 grams of 1-hydrazinoisoquinoline which had not reacted crystallized out. This was separated by filtration and the solution partly evaporated until a viscous liquid was obtained. After cooling to room temperature the viscous liquid became solid and was thereafter recrystallized in acetonitrile. There was obtained 8.0 grams of 3-phenyl-s-triazolo(3,4-a)-isoquinoline having a melting point of 186–187° C. and the following elemental analysis:

Calculated (percent): C, 78.70; H, 4.50; N, 17.20.
Found (percent): C, 78.30; H, 4.53; N, 17.13.

In a similar manner other acid chlorides can be employed in the reaction with hydrazinoisoquinolines. The yield, melting or boiling points, and elemental analysis of other compositions are set forth in Table II.

(b) By reaction of a hydrazinoisoquinoline with an acid anhydride.—4.7 grams of 1-hydrazinoisoquinoline was refluxed in 15 milliliters of acetic anhydride for 1 hour. The excess of anhydride was evaporated in vacuum and the residue recrystallized in a mixture of benzene and cyclohexane. Then was obtained 4.5 grams of 3-methyl-s-triazolo(3,4-a)isoquinoline having a melting point of 168°–169° C. This represents 83 percent of the theoretical value. The product had the following analysis:

Calculated (percent): C, 72.11; H, 4.95; N, 22.93.
Found (percent): C, 72.28; H, 5.03; N, 23.01.

In a similar manner, other acid anhydrides can be employed as set forth in Table II.

(c) By reaction of a hydrazinoisoquinoline with an ester.—6.5 grams of 1-hydrazinoisoquinoline was dissolved in 100 milliliters of diethylmalonate. The solution was heated at 160° C. for 1 hour. Thereafter, the excess of diethylmalonate was evaporated in vacuum and the residue treated with a small quantity of ethanol to solidify the crude product. The latter was recrystallized twice in water and provided 4.2 grams of 3 - (ms - triazolo-(3,4-a)isoquinolyl)ethyl acetate having a melting point of 124°–126° C. and the following elemental analysis:

Calculated (percent): C, 65.86; H, 15.13; N, 16.46.
Found (percent): C, 65.67; H, 5.19; N, 16.05.

In a similar manner other esters can be employed and products obtained as set forth in Table II.

(d) By reaction of a hydrazinoisoquinoline with an acid.—A solution of 4.0 grams of 1-hydrazinoisoquinoline in 15 milliliters of trifluoroacetic acid was refluxed for 2 hours. After evaporation of the excess acid the residue was washed with water. After drying the insoluble portion there was obtained 4.0 grams of 3-trifluoromethyl-s-triazolo(3,4-a)isoquinoline having a melting point after recrystallization in petroleum ether of 147°–150° C. This represented 67 percent yield. The product had the following elemental analysis:

Calculated (percent): C, 55.69; H, 2.55; N, 17.22.
Found (percent): C, 55.65; H, 2.67; N, 17.76.

In a similar manner other acids can be employed and products obtained as set forth in Table II.

(e) By reaction of a hydrazinoisoquinoline with an isocyanate.—15.9 grams of 1-hydrazinoisoquinoline and 11.9 grams of phenyl isocyanate were dissolved in 60 milliliters of 1,2,4-trichlorobenzene and refluxed for 3 hours. After cooling to room temperature the desired product crystallized the crystals were filtered off and washed with benzene and then recrystallized in butane there was obtained 15 grams of 3-oxo-2,3-dihydro-s-triazolo(3,4-a)isoquinoline which represented 81 percent yield. The product had a melting point of 270°–271° C. and the following elemental analysis:

Calculated (percent): C, 64.85; H, 3.87; N, 22.69.
Found (percent): C, 64.71; H, 3.64; N, 23.16.

In a similar manner other isocyanates or urethanes can be employed.

(f) By reaction of a hydrazinoisoquinoline with a disulfide.—9.6 grams of 1-hydrazinoisoquinoline was dissolved in 115 milliliters of carbon disulfide and 150 milliliter of absolute alcohol and refluxed for 3 days. The product crystallized after cooling to room temperature. It was then filtered and recrystallized in ethanol. There was obtained 9.0 grams of 3-thiono-2,3-dihydro-s-triazolo(3,4-a)isoquinoline which represented a 71 percent yield. The product had a melting point of 262°–264° C. and the following elemental analysis:

Calculated (percent): C, 59.69; H, 3.00; N, 20.89; S, 15.93. Found (percent): C, 60.03; H, 3.58; N, 20.96; S, 16.91.

TABLE II.—PREPARATION OF s-TRIAZOLO (3,4-a) ISOQUINOLINES

| Ex. | $R_1$ (or structure) | Acidic reagent or derivative preparation | Solvent | Yield in percent | Melting or boiling point, °C. | Calculated C | Calculated H | Calculated N | Calculated Cl | Calculated S | Calculated O | Found C | Found H | Found N | Found Cl | Found S | Found O |
|---|---|---|---|---|---|---|---|---|---|---|---|---|---|---|---|---|---|
| 15 | —$CH_2COOC_2H_5$ | Diethylmalonate | Diethylmalonate | 40 | 124–126 | 65.85 | 5.13 | 16.46 | | | | 65.67 | 5.19 | 16.05 | | | |
| | | | | | | | | | | | | 65.94 | 5.01 | 16.47 | | | |
| 16 | —$CH_2NHCOC_6H_5$ | Hippuric acid | | 71 | 266 | 71.51 | 4.67 | 18.59 | | | | 71.28 | 4.59 | 18.56 | | | |
| 17 | —$CH_2CH_2NHCOC_6H_5$ | Benzoyl alanine | | 49 | 190–192 | 70.13 | 5.27 | 17.22 | | | | 70.25 | 5.27 | 17.47 | | | |
| 18 | —$CH_2CONHCH_3$ | Prepared from Example 15 by reacting with methylamine. | Alcohol | 87 | 257–260 | 64.97 | 5.03 | 23.32 | | | | 64.97 | 5.25 | 23.31 | | | |
| 19 | —$CH_2CONHC_2H_5$ | do | do | 82 | 246–248 | 66.38 | 5.17 | 22.12 | | | | 66.24 | 5.49 | 22.17 | | | |
| 20 | —$CH_2CON(CH_3)_2$ | Prepared from Example 15 by reacting with dimethylamine. | do | 85 | 202 | 66.12 | 5.55 | 22.03 | | | | 65.42 | 5.53 | 21.90 | | | |
| 21 | (structure with N=C=O, N—CH₃) | Prepared from reaction of diazomethane and compound of Example 37. | Diethylether | 85 | 153–155 | 66.32 | 4.55 | 21.10 | | | | 66.48 | 4.52 | 21.40 | | | |
| 22 | —$SCH_3$ | Prepared from reaction of diazomethane and compound of Example 38. | do | 55 | 140–141 | 61.36 | 4.21 | 19.55 | | | | 61.49 | 4.20 | 19.56 | | | |
| 23 | —$SC_2H_5$ | (structure) | Ethanol | 83 | 99 | 62.90 | 4.80 | 18.30 | | | | 62.61 | 4.89 | 48.59 | | | |
| 24 | —$CH_2CH_2C$ | β-chloropropionic acid chloride | (1) $CH_2Cl_2$ (2) $C_6H_6$ | 79 | 184 | 62.20 | 4.35 | 18.14 | 15.30 | | | 62.74 | 4.63 | 18.30 | 15.18 | | |

TABLE II—Continued

| Ex. | R₁ (or structure) | Acidic reagent or derivative preparation | Solvent | Yield in percent | Melting or boiling point, °C. | Analyses Calculated C | H | N | Cl | S | O | Found C | H | N | Cl | S | O |
|---|---|---|---|---|---|---|---|---|---|---|---|---|---|---|---|---|---|
| 25 | —CH₂CH₂OH | Prepared from Example 15 by reduction with LiAlH₄. | | 38 | 191–192 | 67.60 | 5.20 | 19.17 | | | | 67.75 | 5.16 | 19.47 | | | |
| 26 | —CF₃ | Trifluoroacetic acid. | | 67 | 147–150 | 55.69 | 2.55 | 17.72 | | | | 55.65 | 2.67 | 17.76 | | | |
| 27 | —NH—(naphthyl-N) | Prepared from 1-chloroisoquinoline and aminotetrazole. | | 19 | 277–280 | 73.20 | 4.21 | 22.50 | | | | 72.74 | 4.21 | 22.45 | | | |
| 28 | (structure) | Triethyl ortho formic ester. | | 44 | 84 | 72.11 | 4.95 | 22.94 | | | | 72.22 | 5.09 | 22.77 | | | |
| 29 | (structure) | Acetic anhydride. | | 81 | 186 | 73.09 | 5.62 | 21.31 | | | | 72.38 | 5.70 | 20.86 | | | |
| 30 | (structure) | Triethyl ortho formic ester. | | 65 | 215 | 58.97 | 2.97 | 20.61 | | | | 58.48 | 2.95 | 20.18 | | | |
| 31 | (structure) | Prepared from compound of Example 30 and piperidine. | Ethanol | 52 | 170–172 | 71.40 | 6.39 | 22.21 | | | | 71.70 | 6.44 | 21.18 | | | |
| 32 | (structure) | Diethyloxalase | Diethyl oxalase | 61 | 174 | 56.63 | 3.61 | 15.25 | | | | 56.69 | 3.60 | 15.21 | | | |

TABLE II—Continued

| Ex. | R₁ (or structure) | Acidic reagent or derivative preparation | Solvent | Yield in percent | Melting or boiling point, °C. | Calculated | | | | | Found | | | | |
|---|---|---|---|---|---|---|---|---|---|---|---|---|---|---|---|
| | | | | | | C | H | N | Cl | S | O | C | H | N | Cl | S | O |
| 33 | —NHCH₂—C₆H₅ / C—CONHCH₂—C₆H₅ | Prepared from compound of Example 31 and benzylamine. | Butanol | 64 | 180–1 | 73.69 | 5.20 | 17.19 | | | | 73.82 | 5.29 | 17.26 | | |
| 34 | (Cl-substituted structure, C—H) | Triethyl ortho formic ester | Triethyl ortho formic ester | 65 | 246–247 | 58.98 | 2.97 | 20.64 | | | | 58.91 | 2.93 | 20.61 | | |
| 35 | (Cl-substituted structure, C—CH₃) | Acetic anhydride | Acetic anhydride | 79 | 195 | 60.68 | 3.71 | 19.31 | 16.28 | | | 60.78 | 3.72 | 19.30 | 16.56 | |
| 36 | (Cl-substituted structure, C—CF₃) | Prepared from (structure with NHNHC—CF₃) by cyclisation in polyphosphoric acid. | | 69 | 205–6 | 48.64 | 1.86 | 15.47 | | | | 48.74 | 2.00 | 14.81 | | |
| 37 | (C=O, NH structure) | Phenyl iso cyanate | 1,2,4-trichloro-benzene | 81 | 270–271 | 64.85 | 3.87 | 22.67 | | | | 64.71 | 3.64 | 23.16 | | |
| 38 | (C=S, NH structure) | Carbon disulfide | Ethanol | 71 | 262–264 | 59.69 | 3.50 | 20.89 | | 15.93 | | 60.03 | 3.58 | 20.96 | | 16.19 |

TABLE II—Continued

| Ex. | R₁ (or structure) | Acidic reagent or derivative preparation | Solvent | Yield in percent | Melting or boiling point, °C. | Analyses Calculated C | H | N | Cl | S | O | Analyses Found C | H | N | Cl | S | O |
|---|---|---|---|---|---|---|---|---|---|---|---|---|---|---|---|---|---|
| 39 | (4-Cl-quinoline-C(=O)-NH structure) | Phenylisocyanate | 1,2,4-trichlorobenzene | 61 | 281 | 54.69 | 2.75 | 19.14 | | 16.15 | | 54.70 | 2.76 | 19.10 | | 16.25 | |
| 40 | (CH₃-quinoline-C(=O)-NH structure) | ...do... | ...do... | 62 | 296-297 | 66.32 | 4.56 | 21.10 | | | | 66.60 | 4.62 | 21.06 | | | |
| 41 | (Cl-quinoline-C(=O)-NH structure) | ...do... | ...do... | 55 | 302-303 | 54.69 | 2.75 | 19.14 | | | | 55.05 | 2.86 | 19.03 | | | |
| 42 | —CH₂NH₂·HCl | Prepared by acid hydrolysis of Example 16 | Hydrochloric acid | 86 | ²292-294+ | 56.30 | 4.73 | 23.87 | | | 56.26 | 4.83 | 24.06 | | | | |
| 43 | —NH₂·HCl | Cyanogen bromide | Methanol | 12 | ¹²210-212+ | 52.29 | 4.39 | 24.39 | | | | 52.11 | 4.25 | 24.48 | | | |
| 44 | —CH₂N(CH₃)₂ | Prepared by action of dimethylamine on compound of Example 53 | Ethanol | 50 | 131 | 69.02 | 6.19 | 24.77 | | | | 69.06 | 6.20 | 24.87 | | | |
| 45 | —CH₂N(C₂H₅)₂·2HCl | Prepared by action of diethylamine on compound of Example 53 | ...do... | 55 | 186 | 54.90 | 6.10 | 17.15 | | | | 54.55 | 6.21 | 17.35 | | | |
| 46 | —CH₂NHCH₃ | Prepared by acid hydrolysis of Example 54 | Acetic acid and HBr | 88 | 129 | 67.93 | 5.65 | 26.41 | | | | 67.92 | 5.66 | 26.54 | | | |
| 47 | —CH(NH₂)CH₃·2HBr | Prepared by acid hydrolysis of Example 55 | ...do... | 74 | | 38.50 | 3.75 | 14.95 | | | | 38.30 | 3.92 | 14.58 | | | |
| 48 | —CH₂N(pyrrolidine)·HCl | Prepared by action of pyrrolidine on (structure: isoquinoline-C(=O)—NHNH—CH₂Cl·HClO) | Pyrrolidine | 65 | 145 | 71.50 | 6.35 | 22.20 | | | | 71.14 | 6.39 | 22.18 | | | |
| 49 | —CH₂N(piperidine) | Prepared by action of piperidine on compound of Example 53 | Piperidine | 62 | 167 | 72 | 6.75 | 21 | | | | 71.98 | 6.88 | 20.79 | | | |
| 50 | —CH₂N(morpholine)·2HCl | Prepared by action of morpholine on compound of Example 53 | Morpholine | 75 | 163 | 52.80 | 5.28 | 16.4 | | | | 53.16 | 5.45 | 16.85 | | | |
| 51 | —CH₂CH₂NH₂·HBr | Prepared by acid hydrolysis of Example 56 | Acetic acid and HBr | 81 | 188-191 | 49.1 | 4.44 | 19.11 | | | | 48.88 | 4.66 | 18.93 | | | |
| 52 | —COOC₂H₅ | Diethyl oxalate | Diethyloxalate | 52 | 171 | 64.73 | 4.60 | 17.43 | | | | 64.53 | 4.80 | 17.37 | | | |
| 53 | —CH₂Cl | Prepared by action of chloroacetyl chloride on 1-hydrazinoisoquinoline followed by ring closure in presence of CH₂Cl₂ and triethylene amine | | 35 | 171 | 60.6 | 3.67 | 19.3 | | | | 60.67 | 3.62 | 19.09 | | | |

TABLE II—Continued

| Ex. | R₁ (or structure) | Acidic reagent or derivative preparation | Solvent | Yield in percent | Melting or boiling point, °C. | Calculated C | H | N | Cl | S | O | Found C | H | N | Cl | S | O |
|---|---|---|---|---|---|---|---|---|---|---|---|---|---|---|---|---|---|
| 54 | —CH₂NCH₂COOCH₂—C₆H₅ | Prepared by action of 1-hydrazinoisoquinoline and HOOC—CH₂—N—COOCH₂C₆H₅ with CH₃ |  | 42 | 108 | 69.1 | 5.46 | 16.1 |  |  |  | 68.8 | 5.39 | 16.18 |  |  |  |
| 55 | —CH—NHCOOCH₂C₆H₅ with CH₃ | Prepared by action of 1-hydrazinoisoquinoline and COOH—CH—CH₃ / NH—COOCH₂C₆H₅ |  | 32 | 170–171 |  |  |  |  |  |  |  |  |  |  |  |  |
| 56 | —CH₂CH₂NHCOOCH₂C₆H₅ | Prepared by action of 1-hydrazinoisoquinoline and COOH—CH₂CH₂NHCOOCH₂C₆H₅ |  | 48 | 215–216 | 69.1 | 5.46 | 16.1 |  |  |  | 68.99 | 5.24 | 16.3 |  |  |  |
| 57 | R₁=H, R₄=Cl | Prepared by the action of HONO and CuCl on compound of Example 58. | Water and HCl | 77 | 224–225 | 58.98 | 2.97 | 20.64 |  |  |  | 58.25 | 3.23 | 20.13 |  |  |  |
| 58 | R₁=H, R₄=NH₂ | Prepared by reduction of compound of Example 61(a). | Acetone and methanol | 67 | 250–251 | 65.20 | 4.38 | 30.42 |  |  |  | 65.00 | 4.38 | 30.58 |  |  |  |
| 59 | R₇=NH₂ | Prepared by reaction of 1-hydrazinoisoquinoline and | Water | 75 | 277–278 | 65.20 | 4.3 | 30.42 |  |  |  | 64.38 | 4.34 | 30.44 |  |  |  |
| 60 | R₁=H, R₇=NH₂ | Prepared by reduction of compound of Example 61(b). | Ethanol | 58 | ³240–250 | 54.42 | 4.11 | 25.39 |  |  |  | 54.17 | 4.00 | 25.09 |  |  |  |
| 61(a) | R₁=H, R₄=NO₂ | Prepared by nitration of s-triazolo(3,4-a)isoquinoline with mixture of KNO₃ and K₂SO₄. | H₂SO₄ | ⁴59.5 | 270–274 | 56.07 | 2.82 | 26.16 |  |  |  | 56.10 | 2.71 | 26.17 |  |  |  |
| 61(b) | R₇=NO₂ |  |  | ⁵18.0 | 287–288 | 56.07 | 2.82 | 26.16 |  |  |  | 56.09 | 2.72 | 25.84 |  |  |  |
| 62 | R₁=H, R₅=—O—CH₃, R₆=—O—CH₃ | Prepared from 6,7-dimethoxy-1-hydrazinoisoquinoline and HC(OC₂H₅)₃. |  | 83 |  | 62.88 | 4.80 | 18.34 |  |  |  | 63.22 | 4.90 | 18.11 |  |  |  |
| 63 | R₁=CF₃, R₅=—O—CH₃, R₆=—O—CH₃ | Prepared from 6,7-dimethoxy-1-hydrazinoisoquinoline and CF₃COOH. |  | 66 | 270 | 52.5 | 3.37 | 14.15 |  |  |  | 52.59 | 3.35 | 13.91 |  |  |  |
| 64 | R₁=H, R₄=Cl, R₅=—O—CH₃, R₆=—O—CH₃ | Prepared from 4-chloro-6,7-dimethoxy-1-hydrazinoisoquinoline and HC(OC₂H₅)₃. |  | 68 | 276 | 54.6 | 3.79 | 15.93 |  |  |  | 54.65 | 3.81 | 15.29 |  |  |  |
| 65 | R₁=CF₃, R₄=Cl, R₅=—O—CH₃, R₆=—O—CH₃ | Prepared from 4-chloro-6,7-dimethoxy-1-hydrazinoisoquinoline and CF₃COOH. |  | 60 | 232 | 47.00 | 2.72 | 12.65 |  |  |  | 47.31 | 3.06 | 12.41 |  |  |  |
| 66 | R₁=H, R₃=OH, R₄=NO₂ | Prepared from 6-chloro-s-triazolo(3,4-a)isoquinoline and KNO₃ and H₂SO₄. | H₂SO₄ | Small | 215 | 52.18 | 2.63 | 24.34 |  |  |  | 52.26 | 2.65 | 24.18 |  |  |  |
| 67 | R₄=—CH₂COOC₂H₅, R₃=Cl | Prepared from 4-chloro-1-hydrazinoisoquinoline and ClCCH₂COOC₂H₅ ‖ O |  | 50 | 193 | 58 | 4.15 | 14.5 |  |  |  | 57.86 | 4.09 | 14.43 |  |  |  |
| 68 | R₁=H, R₃=CN | Prepared from 4-cyano-1-hydrazinoisoquinoline and HC(OC₂H₅)₃. |  | 60 | 289 | 68.00 | 3.09 | 28.85 |  |  |  | 67.20 | 3.17 | 28.87 |  |  |  |

¹ Crystallized with ½ mol H₂O.
² Decomposed.
³ HCl salt.
⁴ R₄=NO₂.
⁵ R₇=NO₂.

EXAMPLE 73

Hydrogenation of 3-methyl-s-triazolo(3,4-a)isoquinoline

To 3.0 grams of 3-methyl-s-triazolo(3,4-a)isoquinoline dissolved in 100 milliliters of methanol were added 0.7 grams of Adams catalyst. The mixture was then hydrogenated at room temperature with stirring for a period of 10 days. Thereafter the catalyst was filtered off, the solvent evaporated, and the residue recrystallized in toluene. 3 - methyl-5,6-dihydro-s-triazolo(3,4-a)isoquinoline was obtained in a yield of 50 percent and had a melting point of 154–155.5° C. The product had the following analysis:

Calculated (percent): C, 71.33; H, 5.99; N, 22.69.
Found (percent): C, 70.86; H, 6.03; N, 22.73.

In a similar manner, each of the compositions set forth in Table II can be reduced to the corresponding 5,6-dihydro-s-triazolo(3,4-a)isoquinolines.

In a similar manner, each of the triazolo(3,4-a)isoquinolines set forth in Table II is reduced to the corresponding 5,6-dihydro-s-triazolo(3,4-a)isoquinolines.

Although the invention has been illustrated by the preceding examples it is not to be construed as being limited to the materials employed therein, but rather the invention is encompassed by the generic area hereinbefore disclosed. Various modifications and embodiments of this invention can be made without departing from the spirit and scope thereof.

We claim:
1. 3-trifluoromethyl-s-triazolo[3,4-a]isoquinoline.

References Cited

UNITED STATES PATENTS

| 3,354,164 | 11/1967 | Francis | 260—288 |
| 3,639,406 | 2/1972 | Reimlinger | 260—288 |

FOREIGN PATENTS

| 1,573,135 | 7/1969 | France | 260—288 |

OTHER REFERENCES

Naqui et al., Indian Jour. Chem., vol. 3, pp. 162–4 (1965).

S. Dhu et al., Jour. Het. Chem., vol. 3, pp. 158–64 (1966).

Lenaers et al., Chem. Abstr., vol. 74, col. 3358b (1971).

DONALD G. DAUS, Primary Examiner

U.S. Cl. X.R.

260—247.5, 283 CU, 283 S, 287 R